(12) United States Patent  
Tinianov et al.

(10) Patent No.: US 8,181,738 B2  
(45) Date of Patent: May 22, 2012

(54) ACOUSTICAL SOUND PROOFING MATERIAL WITH IMPROVED DAMPING AT SELECT FREQUENCIES AND METHODS FOR MANUFACTURING SAME

(75) Inventors: Brandon D. Tinianov, Santa Clara, CA (US); Kevin J. Surace, Sunnyvale, CA (US)

(73) Assignee: Serious Energy, Inc., Sunnyvale, CA (US)

( * ) Notice: Subject to any disclaimer, the term of this patent is extended or adjusted under 35 U.S.C. 154(b) by 0 days.

(21) Appl. No.: 12/788,184

(22) Filed: May 26, 2010

(65) Prior Publication Data

US 2010/0230206 A1    Sep. 16, 2010

Related U.S. Application Data

(63) Continuation-in-part of application No. 11/739,520, filed on Apr. 24, 2007, and a continuation-in-part of application No. 11/772,197, filed on Jun. 30, 2007, now Pat. No. 7,745,005.

(51) Int. Cl.  
*E04B 1/82* (2006.01)

(52) U.S. Cl. ........................................ 181/290; 181/292

(58) Field of Classification Search .................. 181/290, 181/292  
See application file for complete search history.

(56) References Cited

U.S. PATENT DOCUMENTS

| | | |
|---|---|---|
| 2,811,906 A | 11/1957 | Chappell |
| 3,092,250 A | 6/1963 | Knutson et al. |
| 3,106,503 A | 10/1963 | Randall et al. |
| 3,160,549 A | 12/1964 | Caldwell et al. |
| 3,215,225 A | 11/1965 | Kirschner |
| 3,336,710 A | 8/1967 | Raynes |
| 3,399,104 A | 8/1968 | Ball, III et al. |
| 3,424,270 A | 1/1969 | Hartman et al. |
| 3,462,899 A | 8/1969 | Sherman |
| 3,468,750 A | 9/1969 | Pfeifer et al. |
| 3,579,941 A | 5/1971 | Tibbals |
| 3,642,511 A | 2/1972 | Cohn et al. |

(Continued)

FOREIGN PATENT DOCUMENTS

CA    2219785 A1    10/1996

(Continued)

OTHER PUBLICATIONS

English Language Abstract, JP Patent First Publication No. 09-203153, Aug. 5, 1997, (2 pages).

(Continued)

*Primary Examiner* — Forrest M Phillips  
(74) *Attorney, Agent, or Firm* — Haynes and Boone, LLP

(57) ABSTRACT

A laminated panel is provided including a first layer of material having external and internal surfaces; a second layer of material having external and internal surfaces; a layer of viscoelastic glue in contact with the internal surface of said first layer of material and with the internal surface of said second layer of material; said glue including an acrylic polymer in a concentration between 10% and 60% by weight, or a tackifier in a concentration between 1% and 70%; or a plasticizing compound in a concentration between 0% and 15%; or a material with $T_g$ greater than 0° C. in a concentration between 0% and 30%. A soundproof assembly is also provided including a first and second panel; at least one spacer between the panels, and a gap between the panels, wherein at least one of the panels comprises a laminated panel as provided above.

40 Claims, 4 Drawing Sheets

U.S. PATENT DOCUMENTS

| | | | |
|---|---|---|---|
| 3,728,209 | A | 4/1973 | Sugaike et al. |
| 3,828,504 | A | 8/1974 | Egerborg et al. |
| 4,003,752 | A | 1/1977 | Isohata et al. |
| 4,112,176 | A | 9/1978 | Bailey |
| 4,117,197 | A | 9/1978 | Krejci et al. |
| 4,156,615 | A | 5/1979 | Cukier et al. |
| 4,347,912 | A | 9/1982 | Flocke et al. |
| 4,364,017 | A | 12/1982 | Tokunaga et al. |
| 4,375,516 | A | 3/1983 | Barrall |
| 4,487,793 | A | 12/1984 | Haines, Jr. et al. |
| 4,488,619 | A | 12/1984 | O'Neill |
| 4,618,370 | A | 10/1986 | Green et al. |
| 4,642,951 | A | 2/1987 | Mortimer |
| 4,663,224 | A | 5/1987 | Tabata et al. |
| 4,678,515 | A | 7/1987 | Green et al. |
| 4,685,259 | A | 8/1987 | Eberhart et al. |
| 4,759,164 | A | 7/1988 | Abendroth et al. |
| 4,778,028 | A | 10/1988 | Staley |
| 4,786,543 | A | 11/1988 | Ferm |
| 4,924,969 | A | 5/1990 | K'Heureux |
| 4,956,321 | A | 9/1990 | Barrall |
| 4,967,530 | A | 11/1990 | Clunn |
| 5,016,413 | A | 5/1991 | Counihan |
| 5,026,593 | A | 6/1991 | O'Brien |
| 5,033,247 | A | 7/1991 | Clunn |
| 5,063,098 | A * | 11/1991 | Niwa et al. ............... 428/76 |
| 5,110,660 | A | 5/1992 | Wolf et al. |
| 5,125,475 | A | 6/1992 | Ducharme et al. |
| 5,158,612 | A | 10/1992 | Savoly et al. |
| 5,240,639 | A | 8/1993 | Diez et al. |
| 5,256,223 | A | 10/1993 | Alberts et al. |
| 5,258,585 | A | 11/1993 | Juriga |
| 5,304,415 | A | 4/1994 | Kurihara et al. |
| 5,334,806 | A | 8/1994 | Avery |
| 5,342,465 | A | 8/1994 | Bronowicki et al. |
| 5,368,914 | A | 11/1994 | Barrett |
| 5,439,735 | A | 8/1995 | Jamison |
| 5,473,122 | A | 12/1995 | Kodiyalam et al. |
| 5,474,840 | A | 12/1995 | Landin |
| 5,502,931 | A | 4/1996 | Munir |
| 5,585,178 | A | 12/1996 | Calhoun et al. |
| 5,603,192 | A | 2/1997 | Dickson |
| 5,629,503 | A | 5/1997 | Thomasen |
| 5,643,666 | A | 7/1997 | Eckart et al. |
| 5,664,397 | A | 9/1997 | Holz |
| 5,691,037 | A | 11/1997 | McCutcheon et al. |
| 5,695,867 | A | 12/1997 | Saitoh et al. |
| 5,768,841 | A | 6/1998 | Swartz et al. |
| 5,824,973 | A | 10/1998 | Haines et al. |
| 5,867,957 | A | 2/1999 | Holtrop |
| 5,907,932 | A * | 6/1999 | LeConte et al. ............... 52/144 |
| 5,910,082 | A | 6/1999 | Bender et al. |
| 5,918,437 | A | 7/1999 | Dobija |
| 5,945,208 | A | 8/1999 | Richards et al. |
| 5,945,643 | A | 8/1999 | Casser |
| 5,954,497 | A | 9/1999 | Cloud et al. |
| 6,077,613 | A | 6/2000 | Gaffigan |
| 6,123,171 | A | 9/2000 | McNett et al. |
| 6,213,252 | B1 | 4/2001 | Ducharme |
| 6,238,594 | B1 | 5/2001 | Turpin et al. |
| 6,240,704 | B1 | 6/2001 | Porter |
| 6,266,427 | B1 | 7/2001 | Mathur |
| 6,286,280 | B1 | 9/2001 | Fahmy et al. |
| 6,290,021 | B1 | 9/2001 | Strandgaard |
| 6,309,985 | B1 | 10/2001 | Virnelson et al. |
| 6,342,284 | B1 | 1/2002 | Yu et al. |
| 6,381,196 | B1 | 4/2002 | Hein et al. |
| 6,389,771 | B1 | 5/2002 | Moller |
| 6,443,256 | B1 | 9/2002 | Baig |
| 6,443,257 | B1 | 9/2002 | Wiker et al. |
| 6,632,550 | B1 | 10/2003 | Yu |
| 6,672,426 | B2 | 1/2004 | Kakimoto et al. |
| 6,676,744 | B2 | 1/2004 | Merkley et al. |
| 6,699,426 | B1 | 3/2004 | Burke |
| 6,715,241 | B2 | 4/2004 | Gelin et al. |
| 6,747,074 | B1 | 6/2004 | Buckingham et al. |
| 6,758,305 | B2 | 7/2004 | Gelin et al. |
| 6,790,520 | B1 | 9/2004 | Todd et al. |
| 6,800,161 | B2 | 10/2004 | Takigawa et al. |
| 6,803,110 | B2 | 10/2004 | Drees et al. |
| 6,815,049 | B2 | 11/2004 | Veeramasuneni et al. |
| 6,822,033 | B2 | 11/2004 | Yu et al. |
| 6,825,137 | B2 | 11/2004 | Fu et al. |
| 6,877,585 | B2 | 4/2005 | Tinianov |
| 6,913,667 | B2 | 7/2005 | Nudo et al. |
| 6,920,723 | B2 | 7/2005 | Downey |
| 6,941,720 | B2 | 9/2005 | DeFord et al. |
| 7,041,377 | B2 | 5/2006 | Miura et al. |
| 7,068,033 | B2 | 6/2006 | Sellers et al. |
| 7,181,891 | B2 | 2/2007 | Surace et al. |
| 7,197,855 | B2 | 4/2007 | Della Pepa |
| 2002/0009622 | A1 | 1/2002 | Goodson |
| 2003/0006090 | A1 | 1/2003 | Reed |
| 2003/0102184 | A1 * | 6/2003 | Brisson et al. ............... 181/290 |
| 2003/0125447 | A1 | 7/2003 | Hoch et al. |
| 2004/0016184 | A1 | 1/2004 | Huebsch et al. |
| 2004/0087721 | A1 * | 5/2004 | Bruhn et al. ............... 525/132 |
| 2004/0168853 | A1 | 9/2004 | Gunasekera et al. |
| 2004/0177590 | A1 * | 9/2004 | Nudo et al. ............... 52/783.1 |
| 2004/0214008 | A1 | 10/2004 | Dobrusky et al. |
| 2005/0050846 | A1 | 3/2005 | Surace et al. |
| 2005/0080193 | A1 * | 4/2005 | Wouters et al. ............... 525/191 |
| 2005/0103568 | A1 | 5/2005 | Sapoval et al. |
| 2005/0136276 | A1 | 6/2005 | Borup et al. |
| 2006/0048682 | A1 | 3/2006 | Wagh et al. |
| 2006/0057345 | A1 | 3/2006 | Surace et al. |
| 2006/0059806 | A1 | 3/2006 | Gosling et al. |
| 2006/0108175 | A1 | 5/2006 | Surace et al. |
| 2006/0124388 | A1 * | 6/2006 | Pompei ............... 181/290 |
| 2006/0260272 | A1 * | 11/2006 | Swiszcz et al. ............... 52/783.1 |
| 2007/0094950 | A1 * | 5/2007 | Surace et al. ............... 52/144 |
| 2007/0107350 | A1 | 5/2007 | Surace et al. |
| 2008/0264721 | A1 | 10/2008 | Tinianov |
| 2009/0000866 | A1 | 1/2009 | Tinianov |

FOREIGN PATENT DOCUMENTS

| | | |
|---|---|---|
| CN | 1358684 A | 7/2002 |
| EP | 1154087 B1 | 11/2001 |
| JP | 09-203153 A | 8/1997 |
| WO | 96/34261 A1 | 10/1996 |
| WO | 97/19033 A1 | 5/1997 |
| WO | 00/24690 A1 | 5/2000 |

OTHER PUBLICATIONS

*A Study of Techniques To Increase The Sound Of Insulation Of Building Elements*, Wyle Laboratories, Prepared for Dept. of Housing and Urban Development, Jun. 1973 (16 pages).

*Field Sound Insulation Evaluation of Load-Beating Sandwich Panels for Housing*, Final Report, Prepared by Robert E. Jones, Forest Products Laboratory, Forest Service, U.S. Department of Agriculture, Aug. 1975 (53 pages).

*Sound Studio Construction On A Budget*, F. Alton Everest, McGraw-Hill, 1997 (7 pages).

*Wood Handbook/Wood as an Engineering Material*, United States Department of Agriculture, Forest Service, General Technical Report FPL-GTR-113, Mar. 1999 (24 pages).

*Transmission Loss Of Plasterboard Walls* by T.D. Northwood, Building Research Note, Division of Building Research, National Research Counsel, Ottawa, Canada, Jan. 19, 1970 (10 pages).

*A Guide To Airborne, Impact, and Structureborne Noise Control In Multifamily Dwellings*, U.S. Department of Housing and Urban Development, Prepared for the National Bureau Of Standards, Washington, D.C., Jan. 1963 (5 pages).

*Transmission Loss of Leaded Building Materials*, Paul B. Ostergaard, Richmond L. Cardinell, and Lewis S. Goodfriend, The Journal Of The Acoustical Society of America, vol. 35, No. 6, Jun. 1963 (7 pages).

*Dictionary of Architecture & Construction 2200 illustrations*, Third Edition, Edited by Cyril M. Harris, Professor Emeritus Of Architecture Columbia University, McGraw-Hill, 2000 (7 pages).

*Dictionary Of Engineering Materials*, Harald Keller, Uwe Erb, Wiley-Interscience by John Wiley & Sons, Inc. 2004 (4 pages).

*Chamber Science and Technology Dictionary*, by Professor Peter M.B. Walker, W & R Chambers Ltd and Cambridge University Press, 1988 (3 pages).

Notification of Transmittal of the International Search Report in corresponding International Application No. PCT/US08/68861 dated Sep. 5, 2008 (1 page).
International Search Report in corresponding International Application No. PCT/US08/68861 dated Sep. 5, 2008 (2 pages).
Written Opinion of the International Searching Authority in corresponding International Application No. PCT/US08/68861 dated Sep. 5, 2008 (8 pages).
Notification of Transmittal of the International Search Report in corresponding International Application No. PCT/US08/68863 dated Sep. 17, 2008 (1 page).
International Search Report in corresponding International Application No. PCT/US08/68863 dated Sep. 17, 2008 (2 pages).
Written Opinion of the International Searching Authority in corresponding International Application No. PCT/US08/68863 dated Sep. 17, 2008 (7 pages).
Pritz. "Loss Factor Peak of Viscoelastic Materials: Magnitude to Width Relations", J. of Sound and Vibration, 246(2): 265-280, 2001.
Noise and Vibration Control Engineering: *Principles and Applications*, Edited by Leo Beranek and Instvan Ver, Chapter 11, John Wiley & Sons, Inc., 1992, (12 pages).
Handbook of *Acoustical Measurements and Noise Control*, Edited by Cyril Harris, Chapter 32; Structureborne Sound Isolation, Chapter 33; Noise Control in Buildings, McGraw-Hill, Inc., 1991, (36 pages).
"Green Glue is your soundproofing solution and noise reduction material", www.greengluecompany.com. (2 pages).
Acoustical: *A Sound Approach To Testing*, www.archest.com/pages (2 pages).
STC—*Sound Transmission Class—Discussion And Use*, www.sota.ca/stc9_info.htm (3 pages).
ASTM International, Designation: C 1396/C 1396M-04, *Standard Specification For Gypsum Board* (7 pages).
Barbara C. Lippiatt, National Institute of Standards and Technology. BEES .3.0, "*Building For Environmental And Economic Sustainability* Technical Manual and User Guide", Oct. 2002, (198 pages).
Takada, et al., *Effect In Reducing Floor Impact Noise Of Recycled Paper Damper Members*, Bulletin of Tokyo Metropolitan Industrial Technology Research Institute, No. 2 (1999) [certified English translation] (13 pages).
*Architectural Acoustics*, M. David Egan, J. Ross Publishing (Reprint 2007) p. 211; originally published McGraw-Hill, 1988 (5 pages).
Hastings, Mardi C.; Godfrey, Richard; Babcock, G. Madison, *Application Of Small Panel Damping Measurements To Larger Walls*, Proc. SPIE vol. 2720, p. 70-76, Smart Structures and Materials 1996: Passive Damping and Isolation (7 pages).
van Vuure, A.W.; Verpoest, I., Ko, F.K., *Sandwich-Fabric Panels As Spacers In A Constrained Layer Structural Damping Application*, Composites Part B 32 (2001) 11-19, Elsevier Science Ltd. (9 pages).
Noise and Vibration Control, Revised Edition, pp. 306-315, Institute of Noise Control Engineering, 1988, Beranek, Leo L. (editor) (9 pages).
Noise and Vibration Control, Chapter Fourteen, *Damping Of Panels*, Ungar, Eric E., pp. 434-473, McGraw-Hill, 1971, Beranek, Leo L. (editor) (7 pages).
Nashif, Ahid D.; Jones, David I. G.; Henderson, John P., *Vibration Damping*, pp. 290-305, John Wiley & Sons, 1985 (18 pages).
Architectural Acoustics, Principles and Practice, John Wiley & sons, 1992, Cavanaugh, William J. and Wilkes, Joseph A. (editors) (332 pages).
FIRE Resistance Design Manual, Sound Control, Gypsum Association, GA-600-94 (14*th* Ed.) (107 pages).
FIRE Resistance Design Manual, Sound Control, Gypsum Association, GA-600-97 (15*th* Ed.) (120 pages).
FIRE Resistance Design Manual, Sound Control, Gypsum Association, GA-600-2000 (16*th* Ed.) (139 pages).

Noxon, Arthur M., *The Chain Is As Strong As Its Weakest Link*, An article written for the first Hong Kong HiFi Show, 1993, Translated and Published in Chinese, http://www.acousticsciences.com/articles/chain.htm (7 pages).
*Quiet Lightweight Floor Systems*, Reprint from Sound and Vibration Magazine, Jul. 1992, by David A. Harris, Building & Acoustic Design Consultants (7 pages).
Joyal, Brian, *Constrained-Layer Systems Provide Weight-Efficient, High Level Damping* (4 pages.).
Dynamat materials http://web.archive.org/web/20010525113753/www.admteschusa.com/Dynamat.html Jun. 12, 2007, ADM Tech—Dynamic Control (15 pages).
Noise Killer: Pro Damping Compound Materials http://www.tnt-audio.com/clinica/noise.html May 18, 2007, 1998 (3 pages).
Waybackmachine search results for Jan. 1, 1996-Jun. 12, 2007 (1 page).
Frankovich, David, *The Four-Fold Method Of Noise And Vibration Control* (8 pages).
Renninger, Jennifer, *Understanding Damping Techniques For Noise And Vibration Control* (8 pages).
Unified Facilities Criteria (UFC) *Noise And Vibration Control*, UFC 3-450-01. May 15, 200, Department of Defense (156 pages).
United States Gypsum, *Architectural And Construction Services, Design Data For Acousticians*, Feb. 1986 (4 pages).
*A Study Of Techniques To Increase The Sound Of Insulation Of Building Elements*, Wyle Laboratories, Prepared for Dept. of Housing and Urban Development, Jun. 1973 (12 pages).
dB-Ply materials Sound Reducing Panels from Greenwood Forest Products, Inc., Apr. 24, 1997 (9 pages).
dB-Rock materials OMNI Products, Inc. (3 pages).
ASC WallDamp materials from Acoustic Sciences Corporation http://web.archive.org/web/20021013031149/www.asc-soundproof.com/index-walldamp . . . May 18, 2007 (21 pages).
Sounddown Viscoelastic Glue DG-A2, Soundown Corporation (2 pages).
Nordisk Akustik A/S materials, http://web.archive.org/web/200206240933724/www.nordisk-akustik.dk/html_uk/prod03.ht . . . Jun. 11, 2007 (4 pages).
IES 2000 *Dampening And Visocelastic Membranes* (Jul. 2, 2003) Atlanta.com/product (pp. 1-6).
Waybackmachine search results for Jan. 1, 1996-May 3,2006 (1 page).
"*Damping of plate flexural vibrations by means of viscoelastic laminae*" by D. Ross, E.E. Ungar, and E.M. Kerwin—Structural Damping, Section III, ASME, 1959, New York (41 pages).
Vandersall, H. L., "*Intumescent Coating Systems, Their development and Chemistry*" J. Fire & Flammability, vol. 2 (Apr. 1971) pp. 97-140 (45 pages).
International Search Report and Written Opinion dated Jan. 15, 2009.
International Search Report and Written Opinion for International Application No. PCT/US10/36411 dated Jul. 27, 2010.
M.N. Darrouj et al., "Optimum Design of Constrained Layer Damping Panels", Materials & Design, vol. 10, No. 4, pp. 202-208, Jul.-Aug. 1989.
Z. Xie et al., "An enhanced beam model for constrained layer damping and a parameter study of damping contribution", Journal of Sound and Vibration, vol. 319, Issues 3-5, pp. 1271-1284, Jan. 23, 2009.
G. Lepoittevin et al., "Optimization of segmented constrained layer damping with mathematical programming using strain energy analysis and modal data", Materials & Design, vol. 31, Issue 1, pp. 14-24, Jan. 2010.
D.I.G. Jones, *Handbook of Viscoelastic Vibration Damping*, John Wiley and Sons, pp. 284-297, Aug. 2001.

* cited by examiner

ACOUSTICAL SOUND PROOFING MATERIAL WITH IMPROVED DAMPING AT SELECT FREQUENCIES AND METHODS FOR MANUFACTURING SAME

CONTINUATION IN PART

The present application is a continuation-in-part of U.S. patent application Ser. No. 11/772,197 filed on Jun. 30, 2007 and assigned to Serious Materials, Inc., the assignee of this application, incorporated herein by reference in its entirety. This application is also a continuation-in-part of co-pending U.S. patent application Ser. No. 11/739,520 filed on Apr. 24, 2007, incorporated herein by reference in its entirety.

FIELD OF THE INVENTION

This invention relates to acoustical damping materials and, in particular, to soundproofing materials of a novel laminated construction which significantly improves the soundproofing ability of walls, ceilings, floors, and doors, thereby to prevent the transmission of sounds from one area to another.

BACKGROUND

Noise control constitutes a rapidly growing economic and public policy concern for the construction industry. Areas with high acoustical isolation (commonly referred to as 'soundproofed') are desirable and required for a variety of purposes. Apartments, condominiums, hotels, schools and hospitals all require rooms with walls, ceilings and floors that reduce the transmission of sound thereby minimizing, or eliminating, the disturbance to people in adjacent rooms. Soundproofing is particularly important in buildings adjacent to public transportation, such as highways, airports and railroad lines. Additionally, facilities such as theaters, home theaters, music practice rooms, and recording studios require increased noise abatement. Likewise, hospitals and general healthcare facilities have begun to recognize acoustical comfort as an important part of a patient's recovery time. One result of the severity of multi-party residential and commercial noise control issues is the widespread emergence of model building codes and design guidelines that specify minimum Sound Transmission Class (STC) ratings for specific wall structures within a building. Another result is the broad emergence of litigation between homeowners and builders over the issue of unacceptable noise levels. In response, to the detriment of the U.S. economy, major builders have refused to build homes, condos and apartments in certain municipalities; and there is widespread cancellation of liability insurance for builders. The International Code Council has established that the minimum sound isolation between multiple tenant dwellings or between dwellings and corridors is a lab certified STC 50. Regional codes or builder specifications for these walls often require STC 60 or more. Such high performance levels are difficult to achieve and field tested designs often fail to perform to the required levels. The problem is compounded when a single wall or structure is value-engineered to minimize the material and labor involved during construction.

One common feature observed in building panels used in walls, ceilings, floors and other construction applications is a notable deterioration of the noise attenuation quality of the panel at low frequencies, particularly at or around 125 Hz. It would be highly desirable to have a building panel that is optimized in sound attenuation and vibration transmission properties such that vibration frequencies from about 50 to about 125 Hz are highly suppressed.

Various construction techniques and products have emerged to address the problem of noise control, but few are well suited to target these selected problem frequencies. Currently available choices include adding gypsum drywall layers, resilient channels and isolated drywall panels, and mass-loaded vinyl barriers with additional drywall panels; or cellulose-based sound board. All of these changes help reduce the noise transmission incrementally, but not to such an extent that identified problem frequencies would be considered fully mitigated (restoring privacy or comfort). Each method broadly addresses the problem with additional mass, isolation, or damping. In other words, each of these is a general approach, not a frequency specific one.

Accordingly, what is needed is a new material and a new method of construction that allows for the maximum reduction of noise transmission at a target frequency of interest, whether it is a low frequency or a high frequency. What is needed is a panel tuned for performance at selected problem frequencies to address the noise encountered in the building acoustics industry.

SUMMARY OF THE INVENTION

In accordance with some embodiments of the present invention, a new laminated structure is disclosed which significantly improves the ability of a wall, ceiling, floor or door to resist the transmission of noise from one room to an adjacent room, or from the exterior to the interior of a room, or from the interior to the exterior of a room at a selected frequency.

The structure includes a lamination of several different materials. In accordance with one embodiment, a laminated substitute for drywall includes a first layer of selected thickness of a gypsum board. An adhesive layer in direct contact with the first layer of material has a selected shear modulus, engineered in relation to the surrounding layers to achieve maximum damping at a target frequency or across a range of frequencies. In one embodiment of the present invention, such a target frequency corresponds to 125 Hz. On the second surface of the adhesive layer, a second layer of selected thickness gypsum board is glued in place. In one embodiment, the glue layer is a modified version of a specially formulated QuietGlue® adhesive, which is a viscoelastic material available from Serious Materials, 1250 Elko Drive, Sunnyvale, Calif. 94089. In addition to the typical chemicals that make up the QuietGlue® adhesive, additional plasticizing compounds or tackifiers are added to shift the shear modulus to a selected value in order to achieve maximum damping at a select frequency while keeping other adhesive material properties constant.

In some embodiments of the present invention, the adhesive layer may include a viscoelastic glue having an acrylic polymer in a selected concentration between about 10% and about 60% by weight. Some embodiments may have an adhesive layer including a tackifier in a selected concentration between about 1% and about 70% by weight. Further embodiments of the present invention may use an adhesive layer including a viscoelastic glue having a plasticizing compound in a selected concentration between about 0% and about 15% by weight; and in some embodiments the adhesive layer may include a viscoelastic glue having a material with $T_g$ higher than 0° C. in a selected concentration between approximately 0% and approximately 30% by weight.

Formed on the interior surfaces of the two gypsum boards, the glue layer may be about 1/16 inch thick. In one embodiment, a 4 foot×8 foot panel consisting of two ¼ inch thick gypsum wall board panels, laminated using one 1/16 inch thick layer of glue, has a total thickness of less than ⅝ inch. When used on both sides of a standard, single wood-stud frame, the assembly may have an STC value of approximately 49 to 51. For comparison, a similar wall assembly constructed with ½ inch thick standard gypsum wallboard may typically have an STC rating of approximately 34. In some embodiments, a reduction in noise transmitted through the wall structure of approximately 20 decibels may be obtained, compared to the same structure using common (untreated) gypsum boards of equivalent mass, thickness, and construction effort.

BRIEF DESCRIPTION OF THE DRAWINGS

This invention will be more fully understood in light of the following drawings taken together with the following detailed description in which.

DESCRIPTION OF SOME EMBODIMENTS

Figure 1:
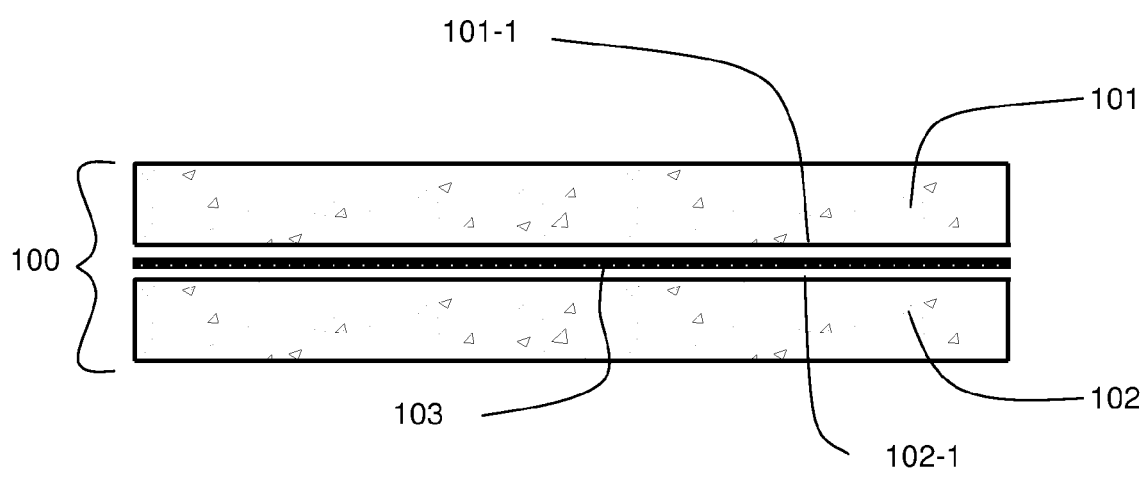
FIG. 1 shows one embodiment of a laminated structure fabricated in accordance with this invention for minimizing the transmission of sound through the material.

The following detailed description is exemplary only and not limiting. Other embodiments of this invention, such as the number, type, thickness, dimensions, area, shape, and placement order of both external and internal layer materials, will be apparent to those skilled in the art in view of this description.

It is helpful to understand how STC is calculated. STC is a single-number rating representing a weighted average of the noise attenuation (also termed transmission loss) of a partition over many acoustical frequencies. The STC number is a rating which is used in the architectural field to rate partitions, doors and windows for their effectiveness in reducing the transmission of sound. The rating assigned to a particular partition design is a result of acoustical testing and represents a fit approach to a set of curves that define the sound transmission class. The test is conducted in such a way as to make measurement of the partition independent of the test environment, and gives a number for the partition performance only. The STC measurement method is defined by ASTM E90 "Standard Test Method Laboratory Measurement of Airborne Sound Transmission Loss of Building Partitions and Elements," and ASTM E413 "Classification for Sound Insulation," used to calculate STC ratings from the sound transmission loss data for a given structure. These standards are available on the Internet under the domain 'www.astm.org'. The STC is derived by fitting a reference rating curve to the sound transmission loss (TL) values measured for the 16 contiguous one-third octave frequency bands with nominal mid-band frequencies of 125 Hertz (Hz) to 4000 Hertz inclusive. The reference rating curve is fitted to the 16 measured TL values such that the sum of deficiencies (TL values less than the reference rating curve), does not exceed 32 decibels, and no single deficiency is greater than 8 decibels. This second limit, termed the '8 dB rule' often limits the sound rating of typical framed construction found in today's buildings. The STC value is the numerical value of the reference contour at 500 Hz. For maximum STC rating, it is desirable for the performance of a partition to match the shape of the reference curve and minimize the total number of deficiencies.

An example of materials poorly designed for performance according to an STC-based evaluation is evident in the case of many typical wood framed wall assemblies. A single stud wall assembly with a single layer of type X gypsum wallboard on each side is recognized as having inadequate acoustical performance. That single stud wall has been laboratory tested to an STC 34—well below building code requirements. A similar wall configuration consisting of two layers of type X gypsum wall board on one side and a single layer of type X gypsum board on the other may have an STC 36—only a slightly better result. In both cases, the rating of the wall is limited by poor transmission loss at 125, 160 and 2500 Hz. In many cases, the performance at 125 Hz, 160 Hz, and 2500 Hz is about five to ten decibels lower than the performance at other nearby frequencies. For example, at 200 Hz, the above wall configuration performs about 12 decibels better than it does at the adjacent measurement frequency, 160 Hz. Similarly, the same assembly performs five decibels better at 3150 Hz than it does at 2500 Hz.

Additionally, some walls may not be designed to perform well with specific regard to an STC curve, but rather to mitigate a specific noise source or frequency of noise. A good example is that of home theater noise. In a multi-channel sound reproduction system having separate low frequency speakers (termed 'subwoofers') the sound includes much energy below 100 Hz. The STC curve does not assess walls or other partitions in this frequency range. Materials or wall assemblies should be selected to isolate this low frequency sound.

More recently, an alternative building noise control product having laminated structures utilizing a viscoelastic glue has been introduced to the market. Such structures are disclosed and claimed in U.S. Pat. No. 7,181,891 issued Feb. 27, 2007 to the assignee of the present application. This patent is hereby incorporated by reference in its entirety. Laminated structures (sometimes called "panels") disclosed in the '891 patent include gypsum board layers that eliminate the need for additional materials such as resilient channels, mass-loaded vinyl barriers, and additional layers of drywall during initial construction. The resulting structures improve acoustical performance over prior art panels by ten or more decibels in some cases. However, the structures described in the '891 patent include a general frequency approach affecting all of the audible frequencies.

A second figure of merit for the sound attenuating qualities of a material or method of construction, in addition to the STC value discussed above, is the loss factor of the panel. The loss factor is a measure of the amount of damping in the material. The higher the loss factor, the greater the damping. The primary effects of increased panel damping are: reduction of vibration at resonance, a more rapid decay of free vibrations, an attenuation of structure-borne waves in the panel, and increased sound isolation.

The loss factor is typically given by the Greek symbol eta, "$\eta$". For simple coating materials, the loss factor may be determined by the ASTM test method E756-04 "Standard Test Method for Measuring Vibration-Damping Properties of Materials." This standard is available on the Internet at the website for ASTM listed above. For more complicated structures, such as the ones described in the present invention, a nonstandard test method or computer model must be employed to predict or measure the composite material loss factor. A loss factor of 0.10 is generally considered a minimum value for significant damping. Compared to this value, most commonly used materials, such as wood, steel, ceramic and gypsum, do not have a high level of damping. For example, steel has a loss factor of about 0.001, gypsum wallboard about 0.03, and aluminum a loss factor of about 0.006.

In order to design or assess the damping properties of a laminated panel that uses constrained layer damping, a predictive model is used such as the well known model first suggested by Ross, Kerwin, and Ungar (RKU). The RKU model uses a fourth-order differential equation for a uniform beam with the sandwich construction of the 3-layer laminated system represented as an equivalent complex stiffness.

The RKU model is described in the article *"Damping of plate flexural vibrations by means of viscoelastic laminae"* by D. Ross, E. E. Ungar, and E. M. Kerwin—Structural Damping, Section IIASME, 1959, New York, the content of which is herein incorporated by reference in its entirety. The topic is also described with specific regard to panels by Eric Ungar in Chapter 14, "Damping of Panels" in Noise and Vibration Control edited by Leo Beranek, 1971. An extension of this model to systems with more than three layers has been developed by David Jones in section 8.3 of his book *Viscoelastic Vibration Damping*. This model is used for some of the predictive calculations according to some embodiments of the present invention.

The process for creating laminated panels in accordance with the present invention takes into account many factors: the type and bending stiffness of the exterior panels, their thickness, and the exact chemical composition of the glue layer. One example of the use of all these parameters will be described in more detail with relation to FIG. 1 below.

FIG. 1 shows laminated structure 100 according to one embodiment of the present invention. In FIG. 1, the layers in the structure are described from top to bottom with the structure oriented horizontally as shown. It should be understood, however, that the laminated structure of this invention will be oriented vertically when placed on vertical walls and doors, as well as horizontally or even at an angle when placed on ceilings and floors. Therefore, the reference to top and bottom layers is to be understood to refer only to these layers as oriented in FIG. 1 and not in the context of the vertical or other use of this structure. In FIG. 1, reference character 100 refers to the entire laminated panel. A top layer 101 is made up of a standard gypsum material and in some embodiments it may be ¼ inch thick. In some embodiments top layer 101 may also be made up of a standard gypsum material and it may be 5/16 inch thick. Of course, many other combinations and thicknesses can be used for any of the layers, as they are suitable for specific purposes. The thicknesses are selected according to the acoustical attenuation (i.e., STC rating) desired for the resulting laminated structure, and the weight of the resulting structure. An excessive weight limits the ability of workers to install the laminated panels on walls, ceilings, floors, and doors for its intended use. The gypsum board in top layer 101 may be fabricated using well-known techniques. Thus the method for fabricating the gypsum board will not be described here. Alternately, layer 101 may be any one of a layer of cement-based board, wood, magnesium oxide-based board or calcium silicate board.

On the bottom surface 101-1 of gypsum board 101 is a layer of viscoelastic glue 103. In some embodiments of the present invention, glue layer 103 may include a glue called "QuietGlue®" adhesive. Glue layer 103 may constitute a continuous layer or may be patterned across the bottom surface 101-1. The pattern of glue 103 coverage may constitute anywhere from twenty (20) to one hundred (100) percent of the surface area 101-1 of gypsum board 101. According to some embodiments of the present invention, glue layer 103 is in direct contact with bottom surface 101-1 of layer 101. Care must be taken to ensure that the separation between different glue portions in a patterned layer is less than ½ the wavelength of sound at the maximum frequency that one is looking to attenuate efficiently. For applications involving most common noise sources, this corresponds to separations no greater than 6 inches in the glue pattern. In some embodiments, it may be preferred that the glue layer coverage of bottom surface 101-1 be greater than twenty (20) percent of said surface area. The patterns of glue making up the glue layer 103 can be applied in strips or squares or other shapes using brushes or glue applicators of well-known design.

The glue included in glue layer 103 is designed with a selected shear modulus to dissipate energy at specific frequencies or frequency ranges. The bottom layer of material 102 is placed over the stack of layers 101, and 103. In some embodiments of the present invention, bottom layer 102 has an internal surface 102-1 which is in direct contact with glue layer 103. The resulting structure is allowed to set for a selected time under a pressure of approximately two to five pounds per square inch, depending on the requirements of each assembly, although other pressures may be used as desired. The set time under pressure can vary from minutes to hours as described above, depending on the state of glue 103 at the time panel 102 is joined to the assembly.

Next, a detailed description of glue layer 103 is given. In some embodiments of the present invention, glue layer 103 may be made of a viscoelastic polymer modified with additives to give it a prescribed shear modulus upon curing, thus optimizing sound dissipation at a selected frequency or range of frequencies. Glue layer 103 may have a thickness from about 1/64 inch to about ⅛ inch although other thicknesses may be used. For example, a glue layer that is about 1/100 of an inch thick can be used without losing the sound attenuation properties of the laminated structure. When energy in sound interacts with the glue which is constrained by surrounding layers, the sound energy will be significantly dissipated, thereby reducing the sound's amplitude across a target frequency or frequency range. As a result, the sound energy which will be transmitted through the resulting laminated structure is significantly reduced. Typically, the glue used in glue layer 103 is made of the materials as set forth in Table I although other glues having similar characteristics to those set forth in Table I below can also be used in this invention.

An important characteristic of the glue composition and the overall laminated structure is the resulting shear modulus of the glue when cured. The shear modulus can be modified to any selected value from $10^2$ to $10^7$ N/m² (or Pascals, 1 Pa=1 N/m²) depending on the frequency range of interest. This can be achieved using the given material composition in the ranges listed in Table 1. Given a selected value for the shear modulus of the viscoelastic glue, a specific thickness for the top and bottom layers of material, and a specific thickness for the layer of viscoelastic glue applied, a one-to-one correspondence can be established between the shear modulus of the glue and the frequency at which the vibration response of the laminated panel has maximum attenuation, at a given temperature. This one-to-one correspondence is consistent with the RKU model discussed above.

Likewise, there is a one-to-one correspondence between the loss factor of a laminated panel and the temperature of operation, at a given sound frequency. The maximum loss factor is obtained for a specific frequency range at a given temperature. Furthermore, the values of frequency and temperature for which noise attenuation is maximized are in an inverse relation with one another: Viscoelastic materials behave "colder" at high frequencies and "warmer" at low frequencies. That is, a laminated panel having maximum acoustic damping performance at a relatively low frequency range at a given temperature will have maximum acoustic damping performance at a higher frequency range at a lower temperature. This phenomenon is reviewed in David Jones' book, *Viscoelastic Vibration Damping*, incorporated herein by reference in its entirety.

Normally, the temperature range chosen to maximize noise performance is that of the expected operation temperatures of the laminated panels and soundproof assemblies in buildings of such high $T_g$ material ($T_g > 0°$ C.) may be acrylic polymer or latex, having particle sizes less than about 0.35 μm (micrometers), added to the glue composition in concentrations between 0% and 30% by weight (Table I).

Some embodiments of the present invention may use varying concentrations of a plasticizing compound in order to change the shear modulus of the viscoelastic glue. In some cases, the concentration of a plasticizing compound may vary between about 0% and about 15% by weight of the viscoelastic glue. Plasticizing compounds used according to some embodiments of the present invention may be adipate plasticizers, or citrate plasticizers. Adipate plasticizers may improve water resistance for the viscoelastic glue composition. Citrate plasticizers may reduce the biochemical impact of the viscoelastic glue composition during manufacturing of the glue, and during installation of the laminate.

TABLE I

QuietGlue ® Adhesive Chemical Makeup

| COMPONENTS | WEIGHT % | | | | | |
|---|---|---|---|---|---|---|
| | Min | Max | Preferred | Shear Modulus $10^3$ Pa (ex. 160 Hz) | Shear Modulus $10^5$ Pa (ex. 2500 Hz) | Shear Modulus $10^6$ Pa (ex. 5500 Hz) |
| acrylate polymer | 30.0 | 70.0 | Shear Modulus Dependant | 60 | 40 | 30 |
| ethyl acrylate, methacrylic acid, polymer with ethyl-2-propenoate | 0.05 | 3.00 | 0.37 | 0.37 | 0.37 | 0.37 |
| hydrophobic silica | 0.00 | 0.50 | 0.21 | 0.21 | 0.21 | 0.21 |
| paraffin oil | 0.10 | 4.00 | 1.95 | 1.95 | 1.95 | 1.95 |
| Silicon dioxide | 0.00 | 0.30 | 0.13 | 0.13 | 0.13 | 0.13 |
| Sodium carbonate | 0.01 | 1.50 | 0.66 | 0.66 | 0.66 | 0.66 |
| Stearic acid, aluminum salt | 0.00 | 0.30 | 0.13 | 0.13 | 0.13 | 0.13 |
| surfactant | 0.00 | 1.00 | 0.55 | 0.55 | 0.55 | 0.55 |
| rosin ester | 1.00 | 70.00 | 4.96 | 4.93 | 4.93 | 4.93 |
| water | 25.0 | 40.0 | 30.90 | 30.90 | 30.90 | 30.90 |
| 2-Pyridinethiol, 1-oxide,sodium salt | 0.00 | 0.30 | 0.17 | 0.17 | 0.17 | 0.17 |
| High Tg (>0 C.) acrylic polymer or latex, particle size <0.35 uM | 0.00 | 30.00 | Shear Modulus Dependant | 0 | 20 | 30 | and other architectural structures. In the case of the present disclosure, the range comprises ambient temperatures from about −17° C. to about 50° C. More preferably, the selected temperature of operation for the laminates and assemblies in some embodiments of this disclosure is in the range from about 4.5° C. to 21° C. This specific temperature range is exemplary and other temperatures within the range from −17° C. to 50° C. can be used for the operation of the laminates and assemblies disclosed herein at a maximum loss factor.

According to some embodiments of the present invention shown in Table I, the shear modulus of the glue may be changed by selecting the percent by weight of an acrylic polymer. Some embodiments of the present invention may use concentrations of acrylic polymer ranging from approximately 10% to approximately 60% by weight. In some embodiments, the acrylic polymer used may be an acrylate polymer or latex, with most other ingredients shown in Table I remaining constant. Some embodiments of the present invention may include acrylate polymers having a glass transition temperature ($T_g$) greater than −40° C. in a selected concentration between approximately 30% and approximately 60% by weight. In some embodiments, addition of high glass transition ($T_g$) temperature polymers to the viscoelastic glue may increase its shear modulus. One example The preferred formulation shown in Table I is merely one example of a viscoelastic glue. Other formulations may be used to achieve similar results and the range given is an example of successful formulations investigated here.

The physical solid-state characteristics of QuietGlue® adhesive include:
1) a broad glass transition temperature below room temperature;
2) a mechanical response typical of a rubber (i.e., elongation at break, low elastic modulus);
3) a strong peel strength at room temperature;
4) a shear modulus between $10^2$ and $10^7$ Pa at room temperature;
6) a low solubility in water (swells poorly); and
7) an ability to peel off the substrate easily at the temperature of dry ice.

QuietGlue® adhesive may be obtained from Serious Materials, 1250 Elko Drive, Sunnyvale, Calif. 94089.

The inclusion of rosin ester in the viscoelastic glue composition enhances the pressure sensitive adhesive (PSA) quality of the glue to a varying degree. In one embodiment of the present invention, a concentration of approximately 5% by weight of rosin ester results in an appropriately tacky glue composition. Some embodiments of the present invention may include a viscoelastic glue having concentrations of up to 70% by weight of rosin ester. Some embodiments of the present invention may comprise viscoelastic glues using a tackifier agent in a selected concentration between 1% and about 70%. The tackifier agent may be a natural resin or a silicate resin.

Some embodiments of the present invention include materials and components that give a fire-resistant quality to the glue composition. The materials and procedures for this purpose are described in detail in U.S. patent application Ser. No. 11/739,520, the contents of which are incorporated herein in its entirety. In some embodiments, intumescent compounds are added to the viscoelastic glue in order to produce fire-resistance enhancement. Intumescent compounds are materials which, when heated above their critical temperature, will bubble and swell, thereby forming a thick, non-flammable, multi-cellular, insulative barrier up to 200 or more times their original thickness. In some embodiments of the present invention, materials acting as intumescent compounds may be Zinc Borate at a preferred concentration of 12%, Melamine Phosphate at a preferred concentration of 6%, Ammonium at a preferred concentration of 6%, or any combination of them. All concentrations are given in percent by weight.

By varying the amount of the given chemical components in QuietGlue® within the ranges shown in Table I, several desired shear moduli from $10^2$ Pa to over $10^7$ Pa can be obtained. Depending upon the construction of the soundproof assembly, the specific shear modulus targets a specific frequency of problem noise. Changing the shear modulus therefore changes the target frequency of noise reduction. For the assembly shown in FIG. 1, in an embodiment in which gypsum layers 101 and 102 are ¼ inch thick, and the viscoelastic glue layer is 1/64 of an inch thick, the frequencies that can be damped for the given shear moduli are listed in Table II.

TABLE II

Shear modulus vs. Frequency

| Shear modulus (Pascals) | Approximate frequency with maximum loss factor (Hertz) |
|---|---|
| $5 \times 10^2$ | 125 |
| $1 \times 10^3$ | 250 |
| $5 \times 10^3$ | 550 |
| $1 \times 10^4$ | 800 |
| $5 \times 10^4$ | 1750 |
| $1 \times 10^5$ | 2500 |
| $5 \times 10^5$ | 5500 |
| $5 \times 10^6$ | 7800 |
| $1 \times 10^7$ | >10,000 |

According to some embodiments of the invention depicted in FIG. 1, gypsum board layer 102 is placed on the bottom of the structure and carefully pressed in a controlled manner with respect to uniform pressure, temperature and time. In some embodiments, the pressure applied to the structure may range from one to five pounds per square inch. Alternately, layer 102 may be any one of a layer of gypsum, cement-based board, wood, magnesium oxide-based board or calcium silicate board.

Finally, the assembly is subjected to dehumidification and drying to allow the panels to dry, typically for forty-eight (48) hours.

In one embodiment of this invention, glue layer 103, when spread over the bottom surface 101-1 of top layer 101 or of any other material, is subject to a gas flow for about forty-five (45) seconds to partially dry the glue. The gas can be heated, in which case the flow time may be reduced. Glue layer 103, when originally spread out over any material to which it is being applied, is liquid. Glue layer 103 is partially dried out either by air drying for a selected time or by providing a gas flow over the surface of the glue. Thus, glue layer 103 becomes a sticky paste much like the glue on a tape, with enhanced PSA characteristics. The gas flowing over glue layer 103 can be, for example, air or dry nitrogen. The gas dehumidifies glue layer 103, improving manufacturing throughput compared to the pressing process described, for example, in U.S. Pat. No. 7,181,891, incorporated herein by reference in its entirety. According to some embodiments described in the '891 patent, glue layer 103 may not be dried for an appreciable time prior to placing layer 102 in place.

Bottom layer 102 is placed over the stack of layers 101 and 103. In some embodiments of the present invention, layer 102 may be in direct contact with glue layer 103. The resulting structure is allowed to set under a pressure of approximately one to five pounds per square inch, for a time which can range from minutes to hours, depending on the state of glue layer 103 in the final assembly. Other pressures may be used as desired, according to some embodiments of the present invention.

In one embodiment, glue layer 103 may be about $1/16^{th}$ of an inch thick, however other thicknesses may be used. Glue layer 103 may be applied with a brush, putty knife, caulking gun, sprayed on, glue tape, or other well known means.

Laminated structure 100 may be dried in a prescribed manner under a pressure of approximately two to five pounds per square inch. Drying is typically performed by heating for a time from about 24 to about 48 hours and at a temperature ranging from about 32° C. to about 49° C. Drying time for the final assembly can be reduced to as little as minutes by flowing, blowing, or forcing air or other inert gas past each layer of glue. In this manner, liquids such as water are removed from glue layer 103, converting the glue into a PSA.

In some embodiments of the present invention, the loss factor, η, of a laminated structure having two external layers (101 and 102) and an internal layer made of a viscoelastic material (103), can be obtained according to the following equation $$\eta = \frac{YX\beta_{103}}{1 + (2+Y)X + (1+Y)(1+\beta_2^2)X^2} \quad (1)$$

Where $\beta_{103}$ is the loss tangent of the viscoelastic glue. The loss tangent is the ratio of the imaginary part to the real part of the shear modulus of the viscoelastic material. Y is the stiffness parameter and X is the shear parameter, given by Eqs. (2) and (3) below $$\frac{1}{Y} = \frac{E_{101}H_{101}^3 + E_{102}H_{102}^3}{12H^2}\left(\frac{1}{E_{101}H_{101}} + \frac{1}{E_{102}H_{102}}\right) \quad (2)$$

Where $E_{101}$ and $E_{102}$ are the Young's Moduli of external layers 101 and 102. $H_{101}$ and $H_{102}$ are the thicknesses of external layers 101 and 102. Parameter H is related to the thickness of viscoelastic layer $H_{103}$ by the following expression $$H = H_{103} + \left(\frac{H_{101} + H_{102}}{2}\right) \quad (3)$$

The shear parameter, X, is defined as $$X = \frac{G_{103}}{n^2 H_{103}} \left(\frac{1}{E_{101} H_{101}} + \frac{1}{E_{102} H_{102}}\right) \quad (4)$$

Where $G_{103}$ is the real part of the complex shear modulus of viscoelastic layer 103. The value of 'n' is: $n=2\pi/\lambda$, where $\lambda$, is the wavelength of the flexural vibration of the panel. Thus, 'n' is the wave-number of sound, and is directly proportional to the frequency of sound (Hz, the abscissa in FIG. 2 below). Therefore, the shear parameter has an inverse dependence on the frequency of sound.

From Eq. (1) it is seen that $\eta$ is negligible for X small and for X large. Therefore, there is a value of $X=X_{opt}$ such that the loss factor, $\eta$, is maximized. This value can be derived from (1) to be:

$$X_{opt} = \frac{1}{\sqrt{(1+Y)(1+\beta_{103}^2)}} \quad (5)$$

Equation (5) shows that for some embodiments of the present invention, the value of frequency of sound where the loss factor, $\eta$, is maximized, may depend on the stiffness parameter, Y, and the loss tangent $\beta_{103}$ of the viscoelastic layer. Thus, suitable thicknesses of layers 101, 102 and 103 may be selected together with viscoelastic glue composition, according to Eq. (5), to obtain best noise performance at a desired frequency.

Moreover, from the analysis in Eqs. (1-5) it is found that the maximum value attainable for a loss factor, $\eta=\eta_{max}$ is given by $$\eta_{max} = \frac{\beta_{103} Y}{2 + Y + \dfrac{2}{X_{opt}}} \quad (6)$$

Thus, the maximum obtainable loss factor, $\eta_{max}$, for a laminated panel, according to the RKU model, increases with both stiffness parameter Y and viscoelastic loss tangent $\beta_{103}$.

Equations (1-6) above result from applying the RKU model to a three layer laminate, and can be found in the article "Optimum Design of Constrained Layer Damping Panels" by M. N. Darrouj and R. G. Faulkner, in Materials & Design Vol. 10 No. 4, pp. 202-208 July/August 1989, incorporated herein by reference in its entirety.

Figure 2:
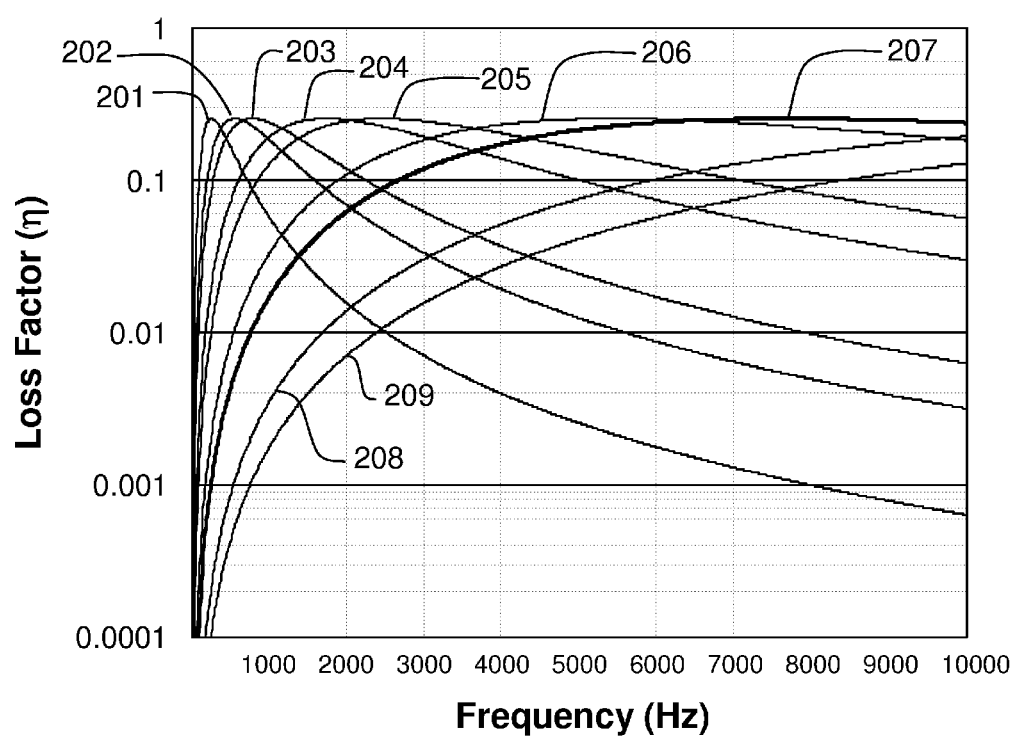
FIG. 2 shows the computed loss factor associated with several laminated panels, each panel having a single glue formulation.

FIG. 2 shows the calculated loss factor for the embodiment shown in FIG. 1, where glue layer 103 has a selected shear modulus. Nine curves are shown in total, representing glue shear moduli from $10^3$ Pa to $10^7$ Pa, as listed in Table II. Curve 201 represents the calculated panel loss factor for laminated panel 100 with glue 103 of a shear modulus of $1\times10^3$ Pa. Panel 100 in curve 201 has a maximum loss factor of approximately 0.25 at about 150 Hz. Curve 202 represents the calculated panel loss factor for laminated panel 100 with glue layer 103 having a shear modulus of $5\times10^3$ Pa. Panel 100 in curve 202 has a maximum loss factor of approximately 0.25 across the range of 500 to 600 Hz. Curve 203 represents the calculated panel loss factor for laminated panel 100 with glue layer 103 having a shear modulus $1\times10^4$ Pa. Panel 100 in curve 203 has a maximum loss factor of approximately 0.25 from about 700 Hz to about 900 Hz. Curve 204 represents the calculated panel loss factor for laminated panel 100 with glue layer 103 having a shear modulus $5\times10^4$ Pa. Panel 100 in curve 204 has a maximum loss factor of approximately 0.25 from about 1600 Hz to about 2000 Hz. Curve 205 represents the calculated panel loss factor for laminated panel 100 with glue layer 103 having a shear modulus $1\times10^5$ Pa. Panel 100 in curve 205 has a maximum loss factor of approximately 0.25 from about 2100 Hz to about 3000 Hz. Curve 206 represents the calculated panel loss factor for laminated panel 100 with glue layer 103 having a shear modulus $5\times10^5$ Pa. Panel 100 in curve 206 has a maximum loss factor of approximately 0.25 from about 5000 Hz to about 7000 Hz. Curve 207 represents the calculated panel loss factor for laminated panel 100 with glue layer 103 having a shear modulus $1\times10^6$ Pa. Panel 100 in curve 207 has a maximum loss factor of approximately 0.25 from about 6000 Hz to about 10000 Hz. Curve 208 represents the calculated panel loss factor for laminated panel 100 with glue layer 103 having a shear modulus $5\times10^6$ Pa. Panel 100 in curve 208 has a loss factor greater than 0.18 at about 10000 Hz and above. Curve 209 represents the calculated panel loss factor for laminated panel 100 with glue layer 103 having a shear modulus $1\times10^7$ Pa. Panel 100 in curve 209 has a loss factor greater than 0.14 at about 10000 Hz and above.

Figure 3:
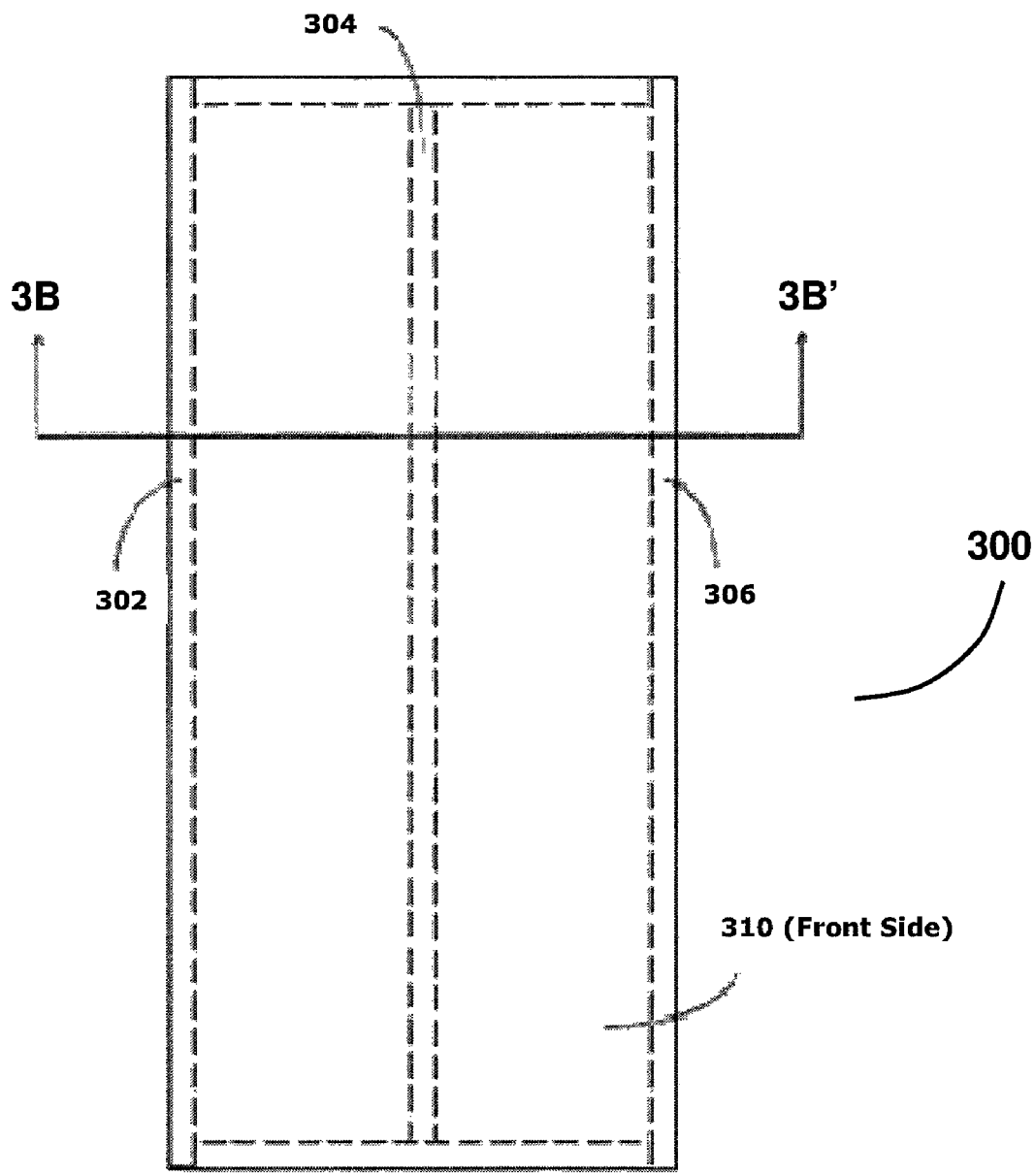
FIG. 3A is a plan view of a soundproof assembly wherein one panel of the soundproof assembly comprises a laminated panel constructed in accordance with an embodiment of the present invention.
FIG. 3B is a cross sectional view taken along lines 3B-3B' in FIG. 3A.
Figure 3:
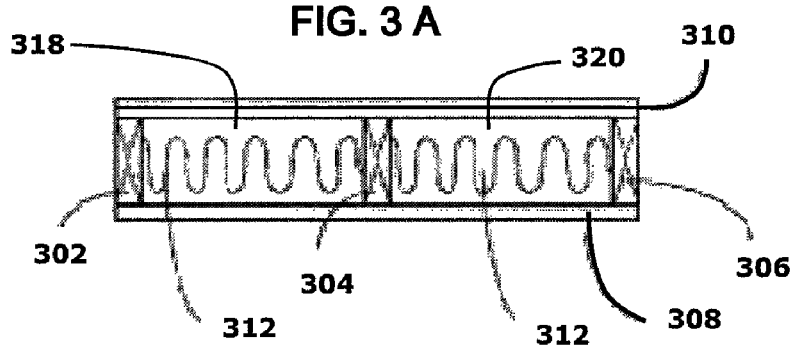

Referring to FIGS. 3A and 3B, soundproof assembly 300 is shown. This assembly includes a front side 310 which is constructed using a material such as laminated structure 100 disclosed in FIG. 1, and a rear panel 308 which is a single layer of type X gypsum wallboard. Type X gypsum wallboard refers to panels which are nominally ½ or ⅝ of an inch thick and are manufactured with sufficient density and internal fiber reinforcement to have them classified as fire resistive for a variety of typical wall construction types. A detailed description of the specifications for type X gypsum wallboard can be found in the ASTM C 1396 standard. Panels 308 and 310 are attached to 2×4 studs 302, 304 and 306. These will be better appreciated by reference to the cross sectional view of FIG. 3B. Batt-type or blown-in thermal insulation 312 is located in each of cavities 318 and 320, which are created by the 2×4 stud structure and panels.

Figure 4A:
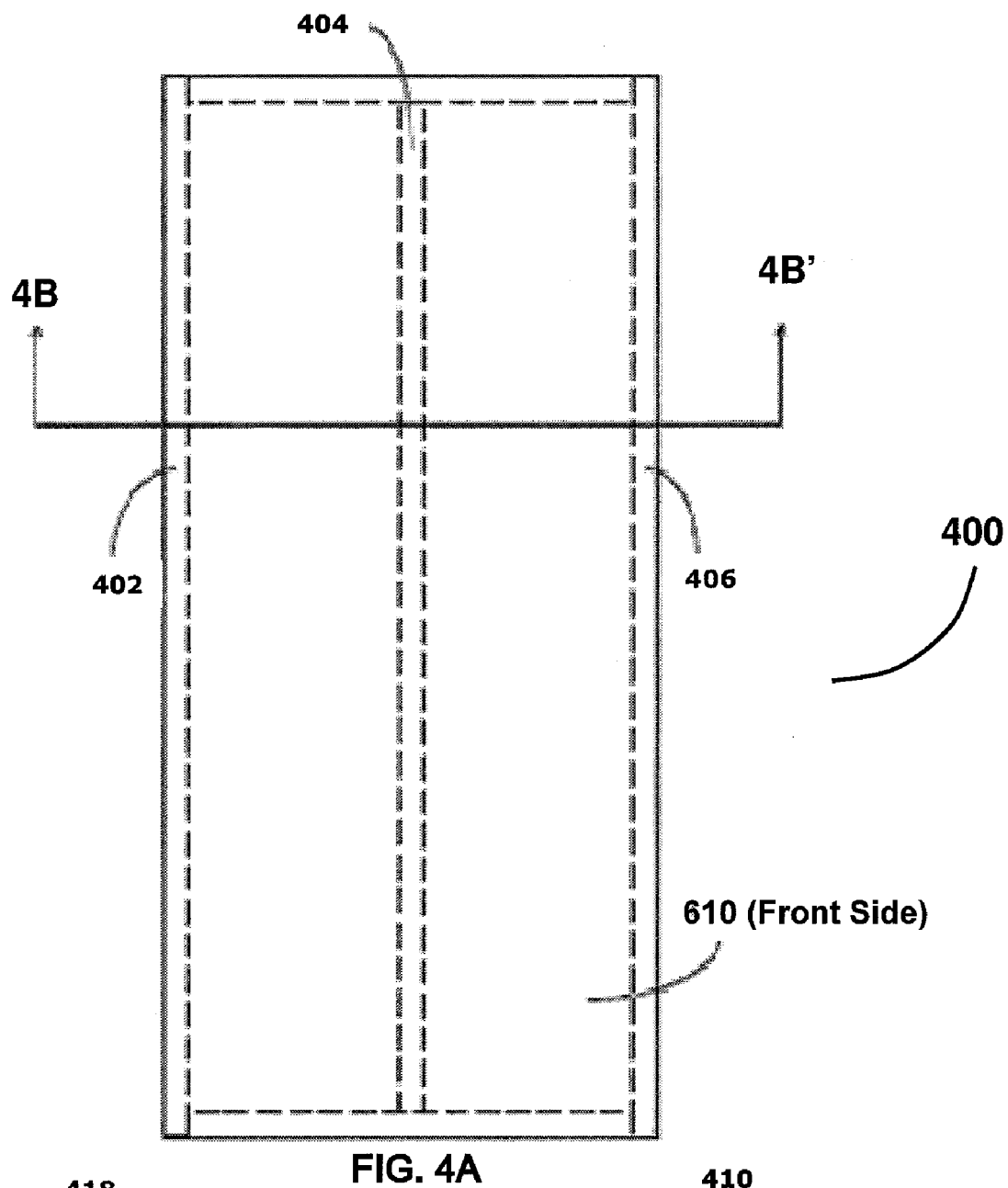
FIG. 4A is a plan view of a wall structure wherein two panels of the soundproof assembly include laminated panels, in accordance with the present invention.
Figure 4B:
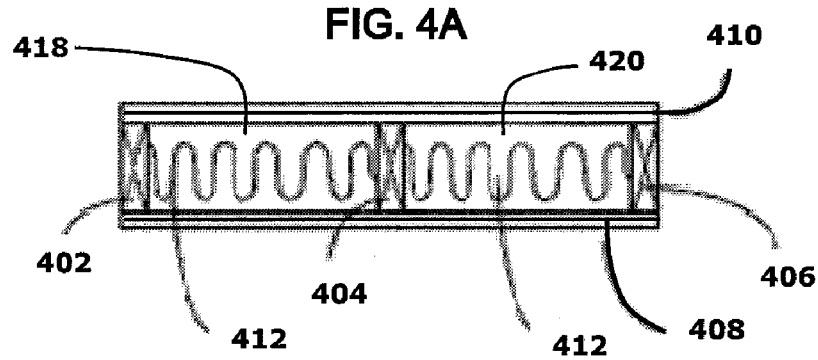
FIG. 4B is a cross view taken along lines 4B-4B' in FIG. 4A.

Referring to FIGS. 4A and 4B, soundproof assembly 400 has a front side 410 and a back side 408, each using a laminated structure of one quarter inch gypsum board constructed using the laminated structure 100 shown in FIG. 1. As disclosed similarly with regard to FIGS. 3A and 3B, the soundproof assembly 400 includes 2×4 stud structures 402, 404 and 406. In a fashion similar to that shown in FIG. 3B, cavities 418 and 420 include batt-type or equivalent insulation 412. Since soundproof assembly 400 includes laminated front and rear panels, an increased sound transmission class rating is provided and similarly additional fire resistance is also provided.

The dimensions given for each material in the laminated structures of the present invention can be varied in view of cost, overall thickness, weight, and desired sound transmission properties. Therefore, these structures can be tailored to give desired sound attenuation in selected frequency ranges.

The above-described embodiments and their dimensions are illustrative only and not limiting. Accordingly, the laminated structure of this invention provides a significant improvement in the sound transmission class number associated with the structures and thus reduces significantly the sound transmitted from one room to adjacent rooms while simultaneously providing specific additional sound dissipation at selected frequencies.

What is claimed is:

1. A laminated panel comprising:
a first layer of material having an external surface and an internal surface;
a second layer of material having an external surface and an internal surface;
a layer of viscoelastic glue in contact with the internal surface of said first layer of material and with the internal surface of said second layer of material, thereby to bond together the first layer of material and the second layer of material, said viscoelastic glue having an acrylic polymer in a selected concentration between about 10% and about 60% by weight of acrylic polymer; further wherein
the viscoelastic glue has a glass transition temperature less than room temperature.

2. The laminated panel of claim 1 wherein said selected concentration of acrylic polymer is about 60% by weight of said viscoelastic glue.

3. The laminated panel of claim 1 wherein said selected concentration of acrylic polymer is about 40% by weight of said viscoelastic glue.

4. The laminated panel of claim 1 wherein said selected concentration of acrylic polymer is about 30% by weight of said viscoelastic glue.

5. The laminated panel of claim 1 further wherein the thicknesses of the first layer of material, the second layer of material, the layer of viscoelastic glue, and the concentration of the acrylic polymer are in accordance with a model for the deformation of a uniform beam comprising a fourth order differential equation, so that attenuation of sound energy is maximized at a selected sound frequency.

6. The laminated panel of claim 5 wherein said selected sound frequency is approximately 125 Hz.

7. A laminated panel comprising:
a first layer of material having an external surface and an internal surface;
a second layer of material having an external surface and an internal surface;
a layer of viscoelastic glue in contact with the internal surface of said first layer of material and with the internal surface of said second layer of material, thereby to bond together the first layer of material and the second layer of material, said viscoelastic glue having a tackifier in a selected concentration between about 1% and about 70% by weight of tackifier further wherein
the viscoelastic glue has a glass transition temperature less than room temperature.

8. The laminated panel of claim 7 wherein said tackifier comprises rosin ester.

9. A laminated panel comprising:
a first layer of material having an external surface and an internal surface;
a second layer of material having an external surface and an internal surface;
a layer of viscoelastic glue in contact with the internal surface of said first layer of material and with the internal surface of said second layer of material, thereby to bond together the first layer of material and the second layer of material, said viscoelastic glue having a plasticizing compound in a selected concentration between about 0% and about 15% by weight of plasticizing compound; further wherein
the viscoelastic glue has a glass transition temperature less than room temperature.

10. The laminated panel of claim 9 wherein said plasticizing compound comprises an adipate plasticizer.

11. The laminated panel of claim 9 wherein said plasticizing compound comprises a citrate plasticizer.

12. A laminated panel comprising:
a first layer of material having an external surface and an internal surface;
a second layer of material having an external surface and an internal surface;
a layer of viscoelastic glue in contact with the internal surface of said first layer of material and with the internal surface of said second layer of material, thereby to bond together the first layer of material and the second layer of material, said viscoelastic glue having a material with $T_g$ greater than 0° C. in a selected concentration between approximately 0% and approximately 30% by weight of the material with $T_g$ greater than 0° C.; further wherein
the viscoelastic glue has a glass transition temperature less than room temperature.

13. The laminated panel of claim 12, wherein the material with $T_g$ greater than 0° C. is selected from the group consisting of acrylic polymer and latex, having a particle size less than 0.35 micrometers.

14. The laminated panel of claim 12, wherein said selected concentration by weight of a material with $T_g$ greater than 0° C. is approximately zero.

15. The laminated panel of claim 12, wherein said selected concentration by weight of a material with $T_g$ greater than 0° C. is approximately 20%.

16. The laminated panel of claim 12, wherein said selected concentration by weight of a material with $T_g$ greater than 0° C. is approximately 30%.

17. A soundproof assembly comprising:
a first panel;
a second panel;
at least one spacer interposed between the first panel and the second panel to provide structural support and an air gap between adjacent sides of the first panel and second panel, wherein at least one of the first and second panels comprises a laminated panel; said laminated panel further comprising:
a first layer of material having an external surface and an internal surface;
a second layer of material having an external surface and an internal surface; and
a layer of viscoelastic glue in contact with the internal surface of said first layer of material and with the internal surface of said second layer of material, thereby to bond together the first layer of material and the second layer of material, said layer of viscoelastic glue having an acrylic polymer in a selected concentration between about 10% and about 60% by weight of acrylic polymer; further wherein
the viscoelastic glue has a glass transition temperature less than room temperature.

18. The soundproof assembly of claim 17 wherein the air gap between said first panel and said second panel is filled with thermal insulation material.

19. The soundproof assembly of claim 17 wherein said acrylic polymer comprises acrylate polymer.

20. The soundproof assembly of claim 17 wherein said selected concentration of acrylic polymer is about 60% by weight of said viscoelastic glue.

21. The soundproof assembly of claim 17 wherein said selected concentration of acrylic polymer is about 40% by weight of said viscoelastic glue.

22. The soundproof assembly of claim 17 wherein said selected concentration of acrylic polymer is about 30% by weight of said viscoelastic glue.

23. A method of forming a laminated panel, said method comprising:
forming a first layer of material having an external surface and an internal surface;
forming a second layer of material having an external surface and an internal surface; and
placing a layer of viscoelastic glue in contact with the internal surface of said first layer of material and with the internal surface of said second layer of material, thereby to bond together the first layer of material and the second layer of material, said layer of viscoelastic glue having an acrylic polymer in a selected concentration between about 10% and about 60% by weight of acrylic polymer wherein
the viscoelastic glue has a glass transition temperature less than room temperature.

24. The method of claim 23 wherein said selected concentration of acrylic polymer is about 60% by weight of said viscoelastic glue.

25. The method of claim 23 wherein said selected concentration of acrylic polymer is about 40% by weight of said viscoelastic glue.

26. The method of claim 23 wherein said selected concentration of acrylic polymer is about 30% by weight of said viscoelastic glue.

27. A method of forming a soundproof assembly comprising:
a first panel;
a second panel;
at least one spacer interposed between the first panel and the second panel to provide structural support and an air gap between adjacent sides of the first panel and second panel, whereby at least one of the first and second panels comprises a laminated panel; said laminated panel further comprising:
a first layer of material having an external surface and an internal surface;
a second layer of material having an external surface and an internal surface; and
a layer of viscoelastic glue in contact with the internal surface of said first layer of material and with the internal surface of said second layer of material, thereby to bond together the first layer of material and the second layer of material, said layer of viscoelastic glue having an acrylic polymer in a selected concentration between about 10% and about 60% by weight of acrylic polymer; wherein
the viscoelastic glue has a glass transition temperature less than room temperature.

28. The method of claim 27 wherein said selected concentration of acrylic polymer is about 60% by weight of said viscoelastic glue.

29. The method of claim 27 wherein said selected concentration of acrylic polymer is about 40% by weight of said viscoelastic glue.

30. The method of claim 27 wherein said selected concentration of acrylic polymer is about 30% by weight of said viscoelastic glue.

31. The method of claim 27 further wherein the thicknesses of the first layer of material, the second layer of material, the layer of viscoelastic glue, and the concentration of the acrylic polymer are in accordance with a model for the deformation of a uniform beam comprising a fourth order differential equation, so that attenuation of sound energy is maximized at a selected sound frequency.

32. The method of claim 31 further wherein said selected sound frequency is approximately 125 Hz.

33. A laminated panel comprising:
a first layer of material having an external surface and an internal surface;
a second layer of material having an external surface and an internal surface;
a layer of viscoelastic glue in contact with the internal surface of said first layer of material and with the internal surface of said second layer of material, thereby to bond together the first layer of material and the second layer of material, said viscoelastic glue having an acrylic polymer in a selected concentration between about 10% and about 60% by weight of acrylic polymer; wherein
the panel has a selected shear parameter for a sound attenuation for frequencies between 125 Hz and 10,000 Hz.

34. The laminated panel of claim 33 wherein the layer of viscoelastic glue is formed in a pattern covering from about 20% to 80% of the area of the internal surface of the first layer of material.

35. The laminated panel of claim 34 wherein the pattern further comprises strips of glue.

36. The laminated panel of claim 33 wherein the layer of viscoelastic glue is formed in a pattern having portions separated from each other by a distance less than ½ the wavelength of sound at the frequency selected for maximum sound attenuation.

37. The laminated panel of claim 34 wherein the frequency selected for maximum sound attenuation is about 1000 Hz.

38. The laminated panel of claim 34 wherein the frequency selected for maximum sound attenuation is about 2500 Hz.

39. The laminated panel of claim 34 wherein the frequency selected for maximum sound attenuation is about 4000 Hz.

40. The laminated panel of claim 33 wherein the layer of viscoelastic glue is formed in a pattern having portions separated from each other by a distance no greater than 6 inches.

* * * * *